June 1, 1943. H. A. KLEINE 2,320,614
AUTOMOBILE BED
Filed Dec. 14, 1940
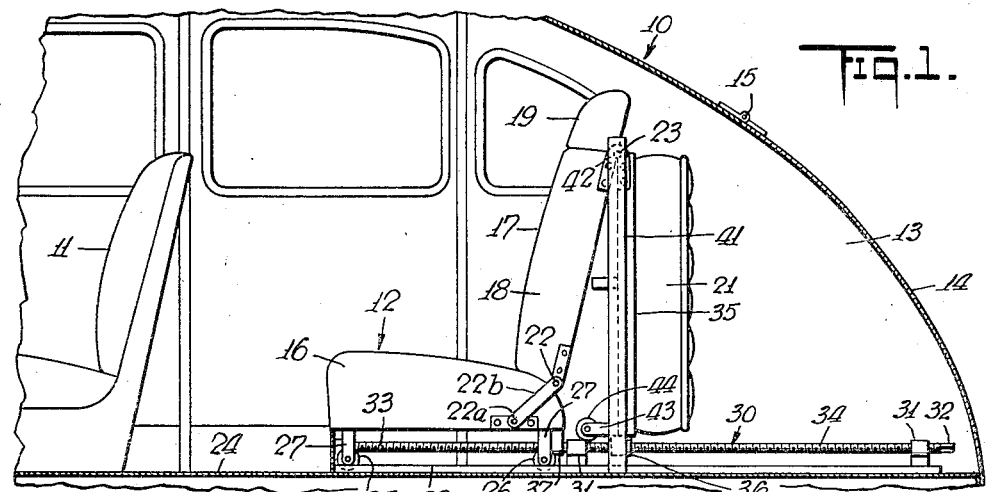
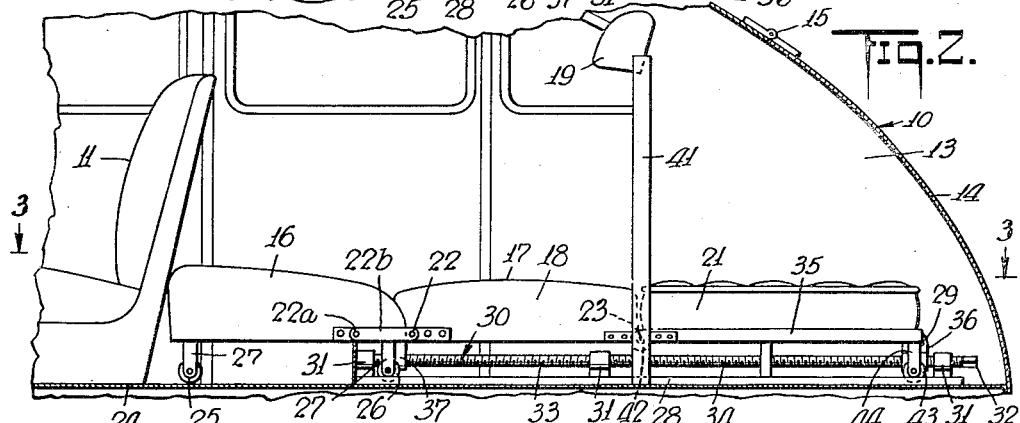
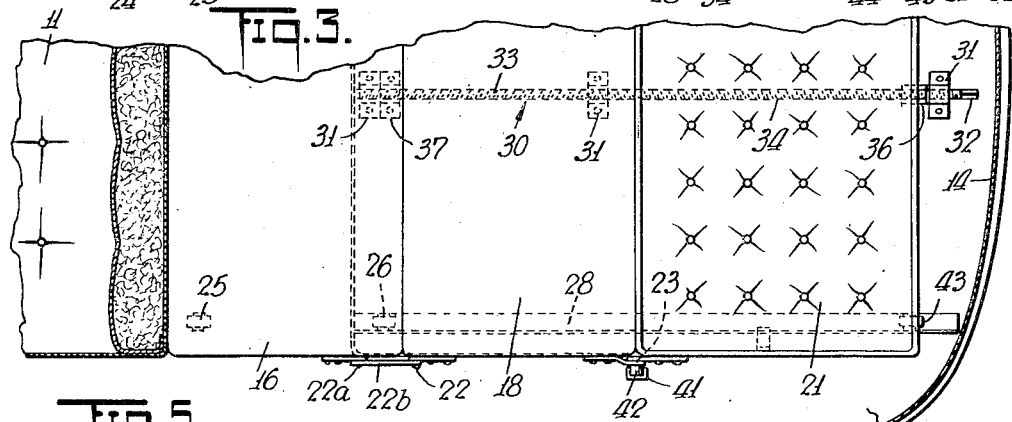
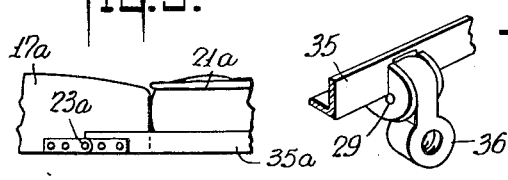
INVENTOR
Harry A. Kleine
BY Richard J. Cowling
ATTORNEY Patented June 1, 1943

2,320,614

UNITED STATES PATENT OFFICE 2,320,614

AUTOMOBILE BED

Harry A. Kleine, Teaneck, N. J.

Application December 14, 1940, Serial No. 370,099

7 Claims. (Cl. 155—7)

The present invention relates to improvements in an automobile seat structure of the type which may be converted into a temporary bed.

One object of the present invention is to provide an automobile seat structure, which can be converted into a bed by a simple manipulation requiring little manual effort.

Another object is to provide an automobile seat structure, which can be converted into a bed by a simple manipulation effected from the rear and outside of the automobile.

Another object is to provide an automobile seat structure, which can be converted into a bed by the simple manipulation of turning a crank accessible from the outside of the automobile.

Another object is to provide a convertible automobile seat structure of the general type referred to, which requires little or no modification in existing automobile bodies.

Another object is to provide a convertible automobile seat structure of the general type referred to, which, when folded to provide a seat, is compact and affords minimum interference with the space in the luggage or rumble seat compartment of the automobile.

Another object is to provide a convertible automobile seat structure of the general type referred to, which is comparatively simple, which lends itself to inexpensive manufacture, which is thoroughly efficient and reliable in use, and which is otherwise well adapted for the purpose for which it is designed.

Various other objects of the invention will be apparent from the following particular description and from an inspection of the accompanying drawing, in which—

Fig. 1 is a fragmentary vertical section of the rear portion of an automobile, and shows somewhat diagrammatically a seat structure embodying the present invention, and indicated in folded position to provide a seat arrangement, Fig. 2 is a section similar to Fig. 1, but showing the various parts of the seat structure unfolded to form a temporary bed, Fig. 3 is a section taken on line 3—3 of Fig. 2, Fig. 4 is a fragmentary perspective showing one of the hinge constructions of the rear bed cushion, and Fig. 5 is a fragmentary side elevation showing another form of structure embodying the present invention.

The present invention is shown in Figs. 1–4 applied to a sedan 10 having the conventional front seat 11, a rear seat 12, and a luggage compartment 13 provided with a door 14 suitably hinged to the sedan body at 15. The seat 12 includes a substantially horizontal seat cushion 16 and a reclining back rest cushion 17. For the purpose to be described, the back cushion 17 has a main movable lower section 18, and a fixed head rest section 19, extending along the top thereof, and forming with the main section 18 a continuous back rest structure.

Extending in the luggage compartment 13 in the rear of the seat 12, and forming part of the bed structure in unfolded position thereof is an auxiliary cushion 21. The three cushions 16, 18 and 21 are pivotally interconnected in series end to end in toggle relationship, and are adapted to be unfolded into horizontal position shown in Fig. 2 to form a temporary bed without disturbing the front seat 11. For that purpose, the two cushions 16 and 18 are hinged together at 22 and 22a through the instrumentality of a connecting link 22b. The cushions 18 and 21 are hinged together at 23 near their top. The back rest section 19 is fixed in position against movement, while the three cushions 16, 18 and 21 are movable from a seating position shown in Fig. 1 to a bedding position shown in Figs. 2 and 3.

The cushion 16 is desirably supported on the foot or floor board 24 of the car for rolling movement therealong by means of rollers 25 and 26, rotatably mounted near each corner of the seat to legs 27 depending from said cushion. These rollers may be made to ride directly over the floor board 24 or if desired rails 28 may be provided along said floor board to form a track at least for the rear rollers 27. These rollers 25 and 26 serve not only as a means for facilitating sliding movement of the cushion 16, but also serve as a means for stably supporting said cushion against tilting action.

In order to effect the folding or unfolding of the cushions 16, 18 and 21, there is provided a shaft or feed screw 30, rotatably supported in suitable bearings 31 against axial movement, and extending substantially medially lengthwise of the car along the floor board 24. This feed screw 30 extends along the floor of the luggage compartment 13 to a point near the rear end of said compartment, and terminates at its rear end in a non-circular section 32, adapted to detachably receive a suitable turning tool as for instance a crank (not shown) when the door 14 is open. Such a crank would have its handle extending outside the luggage compartment 13 for convenient manipulation.

The feed screw 30 comprises a forward section 33 and a rear section 34, these sections being threaded in opposite directions for the purpose to be made apparent. Pivotally connected at 29 to the lower end of the frame structure 35 of the cushion 21 is a sleeve 36, threadedly embracing the rear screw section 34. Fixed to the underside of the frame structure of the seat cushion 16 near its rear is a sleeve 37, threadedly embracing the forward screw section 33. The threads on the screw section 34 are right handed, while the threads on the forward screw section 33 are left handed, so that upon clockwise rotation of the feed screw 30, the sleeve 36 will move towards the right from the seating arrangement shown in Fig. 1, while the sleeve 37 will simultaneously move towards the left. The movement of the sleeve 37 to the left causes the corresponding horizontal forward movement of the seat cushion 16, and the movement of the sleeve 36 to the right will cause the angular movement of the bed cushion 21 from the upright position shown in Fig. 1 to a horizontal position shown in Fig. 2. This movement of the cushions 16 and 21 will cause an unfolding angular movement of the back rest cushion 18 towards horizontal position.

Since the space available for the forward unfolding movement of the cushion 16 is limited by the front seat 11 and is much less than the space available for the rearward movement of the lower end of the cushion 21 from the position shown in Fig. 1, the pitch of the threads on the screw section 34 is greater than that of the screw section 33. The movement of the sleeve 36 to the right will therefore be at a greater speed than that of the sleeve 37 to the left. The relative pitch of the two screw sections 33 and 34 depends of course on the extent of relative movement of the sleeves 36 and 37 necessary to bring the three cushions 16, 18 and 21 into horizontal bedding alignment shown in Fig. 2.

The pivot structures 23 between the two cushions 18 and 21 desirably ride in tracks shown in the form of two oposed upright channel-shaped section 41. These tracks 41 are desirably affixed to the opposite inner sides of the automobile chassis 10, and receive rollers 42 connected to the hinge structures 23. These tracks 41 serve not only as guides and partial supports for the hinge structures 23, but may also serve as part of a frame structure for supporting the upper fixed seat section 19. Although these track sections 41 are shown in a vertical upright position, the shape of these of course depends on the difference in the pitch between the screw sections 33 and 34, the relative length of the cushions 16, 18 and 21 and the relative positions of their interconnecting hinge structures.

To stably support the cushion 21 in horizontal position thereof, the rear end of said cushion carries a pair of legs 43. In order not to injure the floor board 24, said legs 43 are desirably made to rest on the tracks 28, which for that purpose are extended into the luggage compartment 13. Rollers 44 may be supported on the outer ends of these legs 43 to ride on the tracks 28 at least for part of their travel. If desired, the rear section of the track 28 may be inclined or curved to assure rolling contact of the rollers 44 for substantially all of their travel. Also, if desired the legs 43 may be of the type which can be folded inwardly against the inner side of the cushion 21, so that they occupy little space when said cushion is in the inactive folded position shown in Fig. 1.

In the operation of the construction described, when the cushions 16, 18 and 21 are in folded position shown in Fig. 1 to afford a seating arrangement, the cushion 21 will be substantially vertical and folded almost in overlapping contact with the back rest cushion 18. In this position of the cushions 16, 18 and 21, the cushion 21 will occupy very little of the space of the luggage compartment 13, so that almost all of this compartment will be available for storage.

Upon rotation of the feed screw 30, the three cushions 16, 18 and 21 will be moved into horizontal alignment shown in Figs. 2 and 3 to form a bed. By making only the lower section of the back rest movable, and by making the lower end of the rear cushion 21 movable, the three cushions 16, 18 and 21 will be more compactly folded in inoperative position shown in Fig. 1, and the extent of movement necessary to bring these three cushions in horizontal bedding alignment will be also materially reduced. In bedding position shown in Figs. 2 and 3, the cushions 16, 18 and 21 do not interfere with the front seat 11, so that the car may still be driven while the bed is occupied.

In bedding position shown in Figs. 1 and 2, the three cushions 16, 18 and 21 are desirably positioned slightly above dead center alignment, so that upon reversal of rotation of the feed screw 30 the said cushions will be restored into position shown in Fig. 1 to afford a seating arrangement. If the three cushions 16, 18 and 21 are in dead center alignment in bedding position, then a slight upward angular displacement of these cushions may be necessary before reversing the feed screw 30 and restoring said cushions into seating position.

Although the back cushion 17 is shown of sectional construction in Figs. 1 to 4, as far as certain aspects of the invention are concerned the back cushion 17a may be constructed as a unit as shown in Fig. 5 with the end of the rear cushion 21a spaced from the hinge 23a by the frame structure 35a, so that the movement of the two cushions 17a and 21a into bedding alignment will not be any greater than that of the construction of Figs. 1–4.

If desired, the adjoining ends of the two cushions 17a and 21a may be formed with complemental recesses to form a rabbet joint therebetween in horizontal position of said cushions.

It is to be understood that the term "automobile" as used in the specification and claims shall be interpreted generically, and shall include all forms of vehicle transportation.

As many changes could be made in the above construction and many apparently widely different embodiments of this invention could be made without departing from the scope of the claims, it is intended that all matter contained in the above description or shown in the accompanying drawing shall be interpreted as illustrative and not in a limiting sense.

What is claimed is:

1. In an automobile having three cushions pivotally connected in series and foldable into position to form a seating arrangement with the forward end cushion in substantially horizontal position to afford a seat, the intermediate cushion in substantially upright position to form a back rest for said seat and the rear end cushion foldable substantially into an upright position close to said intermediate cushion, a rotatable driving member mounted below said cushions and accessible from the outside of the automobile, and driven means responsive to the rotation of said driving member operative to move the front and intermediate cushions forwardly and the rear end cushion backwardly into substantially horizontal alignment to form a bed.

2. In an automobile having three cushions pivotally connected in series and foldable into position to form a seating arrangement with the forward end cushion in substantially horizontal position to afford a seat, the intermediate cushion in substantially upright position to form a back rest for said seat and the rear end cushion foldable substantially into an upright position close to said intermediate cushion, a rotatable driving shaft extending along the floor of said automobile and outwardly thereof whereby it is accessible for operation from the outside, and driven means responsive to the rotation of said driving shaft operative to move simultaneously the front and intermediate cushions forwardly and the rear end cushion rearwardly into substantially horizontal alignment to form a bed.

3. In an automobile having three cushions pivotally connected in series in toggle relationship and foldable into position to form a seating arrangement with the forward end cushion in substantially horizontal position to afford a seat, the intermediate cushion in substantially upright position to form a back rest for said seat and the rear end cushion foldable substantially in an upright position close to said intermediate cushion, a driving shaft mounted below said cushions and being accessible from outside of the automobile, and driven means responsive to the rotation of said driven shaft operative to move the front and intermediate cushions forwardly and the rear end cushion rearwardly into substantially horizontal alignment to form a bed.

4. In an automobile having three cushions pivotally connected in series in toggle relationship and foldable into position to form a seating arrangement with the forward end cushion in substantially horizontal position to afford a seat, the intermediate cushion in substantially upright position to form a backrest for said seat and the rear end cushion foldable substantially in an upright position close to said intermediate cushion, a driving shaft extending longitudinally adjacent the floor of the automobile whereby it is accessible from the rear and outside thereof, and driven means responsive to the rotation of said driving shaft operative to move the front and intermediate cushions forwardly and the rear end cushion rearwardly into substantially horizontal alignment to form a bed.

5. In an automobile of the type having a luggage compartment, three cushions pivotally connected in series and foldable into position to form a seating arrangement with the forward end cushion in substantially horizontal position to afford a seat, the intermediate cushion in substantially upright position to form a back rest for said seat and the rear end cushion foldable substantially into an upright position close to said intermediate cushion, a driving member extending longitudinally of the automobile beneath said cushions and into said luggage compartment whereby it is accessible through the door thereof when the same is open, and a plurality of separate driven means mounted on the backs of said cushions which are responsive to the movement of said driving member operative to move simultaneously the front and intermediate cushions forwardly and the rear end cushion rearwardly into substantially horizontal alignment to form a bed.

6. In an automobile having three cushions pivotally connected in series in toggle relationship and foldable into position to form a seating arrangement with the forward end cushion in substantially horizontal position to afford a seat, the intermediate cushion in substantially upright position to form a back rest for said seat and the rear end cushion foldable substantially into an upright position close to said intermediate cushion, a feed screw extending longitudinally of said series of cushions, a sleeve threadedly embracing said feed screw and connected to said forward end cushion, a second sleeve screw threadedly embracing said feed screw and pivotally connected to the lower end of the rear end cushion, the threads on the feed screw sections embraced by said sleeves extending in opposite directions, whereby upon rotation of said feed screw said sleeves will move in opposite directions therealong to move the front and intermediate cushions forwardly and the rear end cushion rearwardly into substantially horizontal alignment to form a bed.

7. In an automobile, three cushions pivotally connected in series end to end and foldable in position to form a seating arrangement, with the forward end cushion in substantially horizontal position to afford a seat, the intermediate cushion in substantially upright position to form the lower part of a back rest for said seat, and the rear end cushion folded substantially close to said intermediate cushion, and a fourth cushion extending along the top of said intermediate cushion and forming with said intermediate cushion a back rest, said three first-mentioned cushions being movable into substantially horizontal alignment to form a bed without disturbing said fourth cushion.

HARRY A. KLEINE.